April 1, 1969            D. B. FOSTER            3,436,555
OVALITY MEASUREMENT APPARATUS COMPRISING TWO PHOTOELECTRIC
GAUGING SYSTEMS HAVING AN ANGLE BETWEEN THEIR
OPTICAL AXES OF THE ORDER OF 70°
Filed Aug. 23, 1965
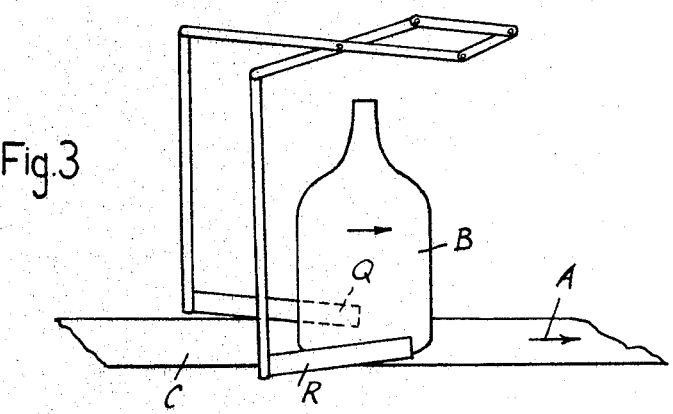
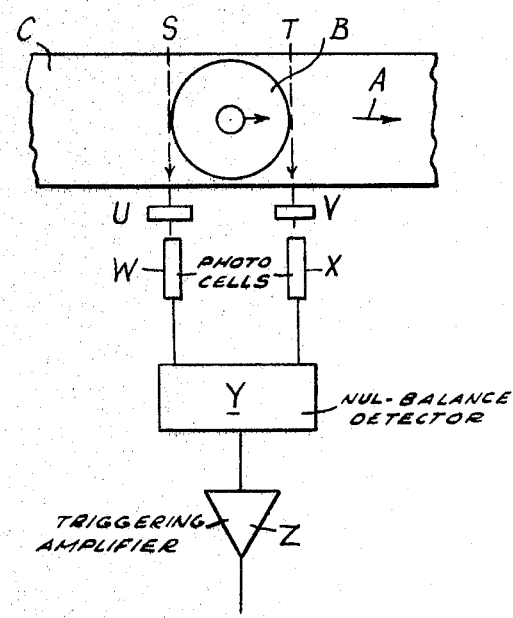
Inventor
D. B. FOSTER

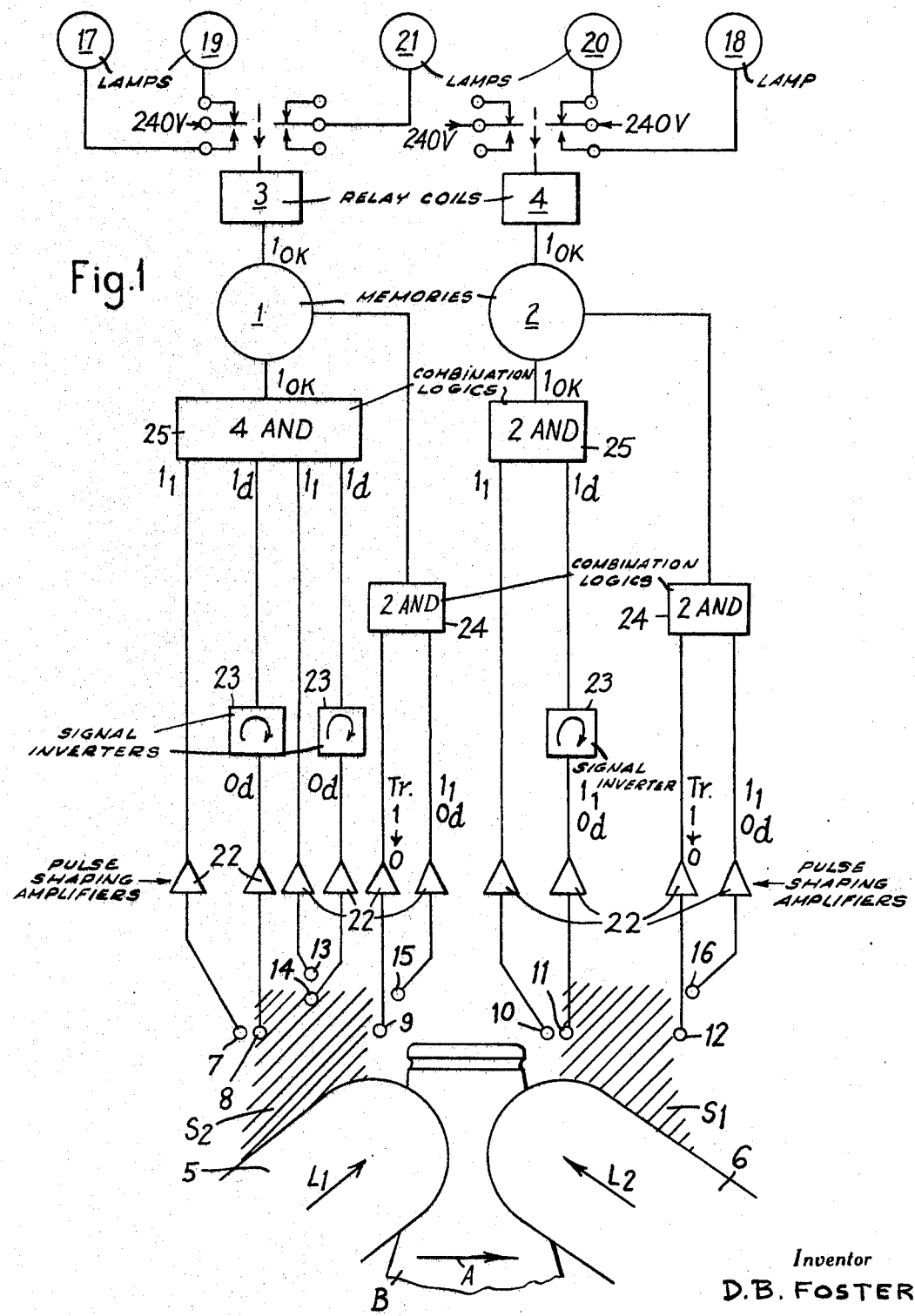

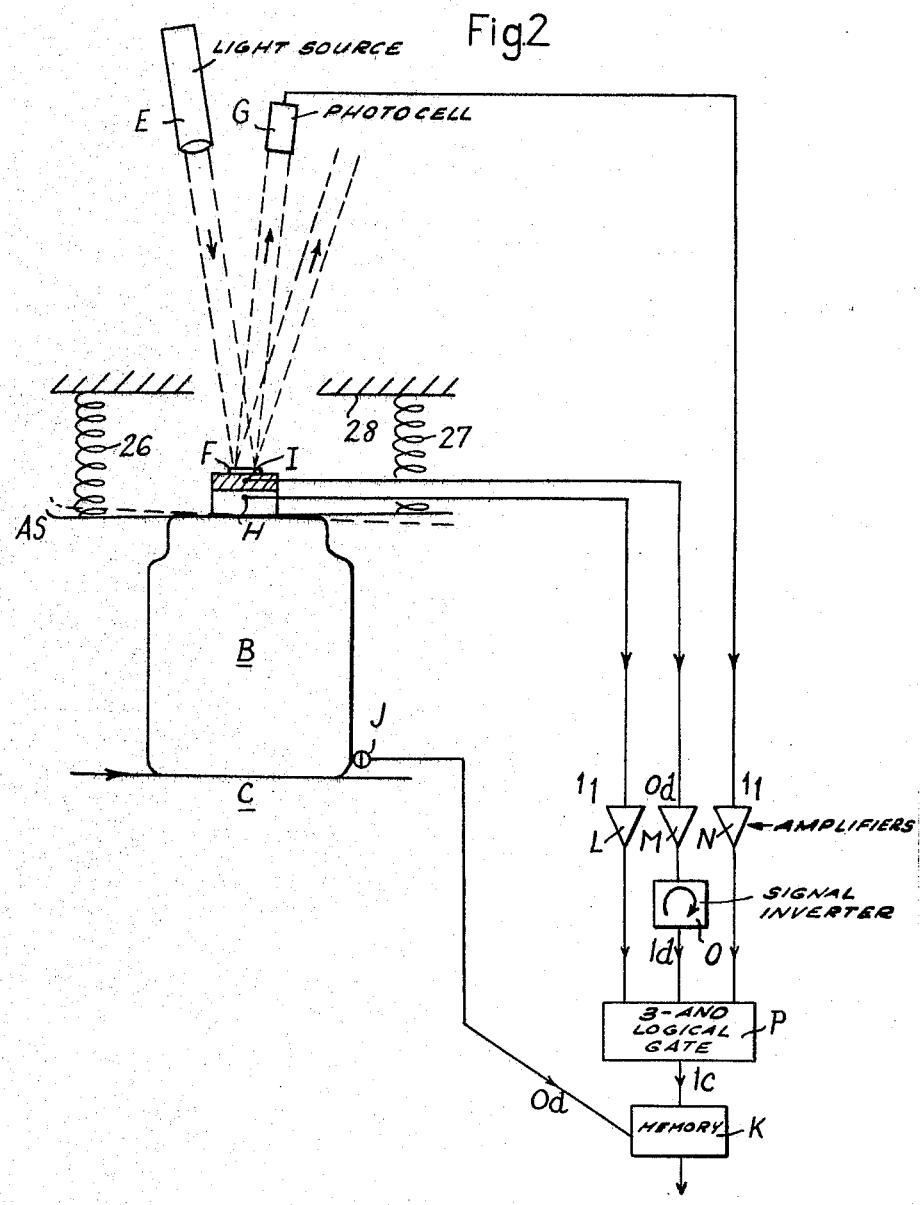

United States Patent Office 3,436,555
Patented Apr. 1, 1969

3,436,555
OVALITY MEASUREMENT APPARATUS COMPRISING TWO PHOTOELECTRIC GAUGING SYSTEMS HAVING AN ANGLE BETWEEN THEIR OPTICAL AXES OF THE ORDER OF 70°
David Blythe Foster, Windlesham, Surrey, England, assignor to North Atlantic Research Products Limited, London, England, a British company
Filed Aug. 23, 1965, Ser. No. 481,536
Claims priority, application Great Britain, Aug. 24, 1964, 34,599/64
Int. Cl. H01j *39/12;* G01n *21/30*
U.S. Cl. 250—223                                        5 Claims

ABSTRACT OF THE DISCLOSURE

This invention relates to the recognition and measurement of objects and constitutes the improvements of the system described in applicant's Patent No. 3,365,699, the present invention having for a particular object to extend the method described in the aforementioned patent for measurement of the ovality of an object, such as the neck of a glass bottle. This is achieved by the present invention by using two distinct and separate systems of apparatus of the kind described in the aforementioned patent but with these two systems scanning the object under scrutiny at two different angles. In practice, an angle of the order of 70° between the two light beams is particularly appropriate.

---

The present invention relates to methods of and apparatus for the recognition and measurement of objects, particularly moving objects. In particular this application relates to modifications in or improvements of the system described in my prior copending application Ser. No. 296,314 now Patent No. 3,365,699 filed July 19, 1963, for "Automatic Recognition of an Object."

In the said patent application above referred to, there is described an apparatus for the accurate dimensional measurement of moving objects, for example, glass bottles moving on a conveyor belt. It is an object of the present invention to extend the method for the measurement of ovality of an object such as the neck of a glass bottle and the means whereby this is achieved.

According to the invention this object is achieved by using two distinct and separate systems of apparatus of the kind described and claimed in my said copending application, but with these systems scanning the object under scrutiny at two different angles. In practice it has been found that an angle of the order of 70° between the two light beams is particularly appropriate.

Thus, a first scanning system may be made responsible for gauging the neck width of a glass bottle at one diametrical chord whereas, and at a later time, a second and independent system may inspect the bottle neck on a different diametrical chord at, say, 70° to the first system.

The invention is thus, in general, based on the concept of combining two gauging instruments at an angle to each other to give an effective decision on ovality whilst the object under scrutiny is moving.

In order that the invention may be more clearly understood, reference will now be made to the accompanying drawings showing some embodiments thereof by way of example and in which:

FIGURE 1 shows a block schematic diagram setting forth the logical arrangement of signals involved in the system, FIGURE 2 shows schematically a photoelectric system for simultaneous measurement and gauging of the means height and neck tilt of a container such as a glass bottle or jar, FIGURE 3 schematically shows a perspective view of means for centralising of a moving object, and FIGURE 4 schematically shows a plan view of a symmetry-assymetry sensing means for use in the system.

Referring now to the drawings, the logical arrangement of signals involved is as shown in FIGURE 1 and the output of each system is caused to operate a solid state memory 1, 2, the output of which passes individually to two relay coils 3, 4. The contacts of the relay coils 3 and 4 may be connected together in AND combination logic to indicate that both the diametrical and chord measurements are within the prescribed limits.

The system being based on that described and claimed in the aforesaid copending patent application, there is no necessity to set out here a complete breakdown of the system nor of the logical configuration illustrated in FIGURE 1. It is only sufficient to point out that the system is being employed in this embodiment by example in the measurement and gauging of bottles, one of which is shown at B as being passed through the system in the direction of arrow A whilst light is being projected at it in the direction of arrows $L_1$ and $L_2$. The light $L_1$ and $L_2$ cast shadows $S_1$ and $S_2$ respectively, the light beams being covered by shields 5 and 6. The shadows are cast on a suitable surface and are monitored by an array of photocells; of which 7 and 8 monitor the limits of the shadow $S_2$ at the neck, in conjunction with trigger cell 9, 10 and 11 monitor the limits of the shadow $S_1$ at the neck, in conjunction with trigger cell 12, and cells 13 and 14 monitor the limits of the top of the shadow for height gauging. Guard cells are shown at 15 and 16 for inhibiting the trigger cells from a second or subsequent operation as described e.g. in conjunction with the arrangement of FIGURE 7 of the said copending application. Thus, the array monitors both diametrical and chord measurements by duplicating the system in the said copending application, and also height.

For reading-off the monitored dimensioning or gauging, a number of signal devices, conveniently lamps, is provided. For example yellow lamps may be provided for a "pass" signal for the diametrical gauging and the chordal gauging, at 17 and 18, and red lamps 19 and 20 to indicate rejection of either dimension gauging. If both dimensions are correct an additional lamp 21 is provided of another colour, e.g. green.

As referred to, in FIGURE 1, there is also shown a height measurement and this is simultaneous with the first diametrical chord measurement, from which it will be apparent that the ovality measurement may be combined with other sorts of measurement.

In this FIGURE 1 the signals illustrated have the following significances:

$1_1$=A signal 1 with the cell light
$1_d$=A signal 1 with the cell dark
$0_d$=A signal 0 with the cell dark
$Tr$=Trigger
$1_{ok}$=A signal 1 on correct combination, the signals 1 and 0 representing the two digits of the binary logic system, as will be apparent The pulse-shaping amplifiers necessary for operation of the systems as will be apparent from the said copending application, are shown at 22, the signal inverters at 23, the trigger transit guard logic units at 24, and the combination logic units at 25, the units 24 passing a "Read Now" signal to the memory units 1 and 2.

FIGURE 2 of the accompanying drawings shows a photoelectric system for simultaneous measurement-gauging of the mean height and neck tilt of a container such as a glass bottle or jar. Referring to the drawing, a container B is caused to move in the direction indicated by the arrow, on a conveyor C. A skid AS which is lightly spring-suspended and damped as shown by springs 26, 27 and support 28, is engaged by the container neck, and the skid AS assumes the same tilt as the neck.

A source of light E comprising a pencil of parallel light rays falls on a mirror F carried on the skid AS. When the container neck and the skid are level, the pencil of light is reflected into a photocell G. but when the container neck and the skid are tilted in any direction, the light is deflected from the photocell G which then goes "dark." Photocells at H and I scan an opaque bridge carried by the skid, and when the upper cell I is dark and the lower cell H is light, when a beam of light (not shown) is projected towards the bridge, then the container is of the correct height limits. A trigger cell at J gives a "Read Now" signal to a memory unit K. The signals from the photocells G, H, and I are amplified by amplifiers L, M, and N. The output from amplifier M is logically inverted by a signal inverter amplifier O and the three outputs are then taken to a 3-AND logical gate P the single correct output signal from which is taken to the memory unit K, triggered by the "Read Now" cell J. If the container is made from glass, the trigger cell J is located at the bottom thereof.

The bridge piece for the measurement of mean height is preferably of hemispherical form, or may be a section of a sphere, so that tilt in the direction at right angles to the plane of the paper in FIGURE 2 does not obscure the two photocells H and I.

In dimensional inspection systems of the type described in the said co-pending application, it is sometimes desirable to be able to initiate the "Read Now" signal (the "triggering signal") with reference to the theoretical axis of the container. This particularly arises in the case of measuring tall bottles for neck tilt with reference to their bases, but if the diameter of the base is also varying then a trigger signal initiated from the front or leading edge of the bottle, this can be a source of error. Furthermore in applications involving ovality of bottle neck, and indeed, all measurements, it is desirable for the item such as a bottle to be running on a theoretical axis with respect to the direction of motion.

In order to achieve both these aims, i.e. axial precision both as to direction of motion and transverse to it, the following method may be used according to the invention.

Referring to FIGURE 3, a container such as a bottle B coming along the conveyor C in the direction of the arrow A is centralised by two fingers Q and R which are themselves connected above by a mechanism of the lazy tongs type as shown, or an equivalent well known form (such as coupled gear wheels), the effect of which is to keep the ends of the fingers at equal distances from a theoretical mid-axis. In this fashion items such as bottles can be centralized on to an axis running in the direction of motion, irrespective of variations in the diameter of the object being so positioned.

Referring to FIGURE 4, parallel sources of light S and T fall on two longitudinal slits U and V which contain a light-diffusing material or have such a property, and thence into the two photocells W and X. As the bottle, seen in plan view, traverses the conveyor axis, a position will be reached where the light falling into the forward cell is decreasing by shadow obscuration and the light falling into the trailing cell is rising by shadow removal. It will be clear that, using balanced optics and photocell characteristics, a position will be reached corresponding to symmetry about the central axis of the bottle when the rising current will equal the falling current and that a "trigger signal" initiated from this balance would essentially refer to a state of symmetry of the bottle about a theoretical central axis.

To achieve this result the outputs from the two photocells W and X are taken to a null-balance detector Y which can be one of several kinds already established in the electronic art, such as a bridge detector of a diode resistance level comparator. The detection of this state of balance is then used to initiate a triggering amplifier Z of the form described in the aforementioned copending patent application to give rise to a "Read Now" signal.

When this system is used for the detection of the distortion of bottle necks and neck-examining system may be the one for ovality detection described in FIGURE 1 but modified so that the trigger signals are replaced by the single trigger signal so generated as described above.

I claim:

1. An apparatus for the automatic dimensional inspection of moving articles incorporating a system in which the shadow of an article falls onto an array of photocells only one cell of which normally operated or energised by the leading edge of said shadow operates a rate-of-charge-interrogation channel of a solid state flip-flop unit, the instantaneous logical sign of at least one logical channel to said flip-flop unit being determined by the combination logic result of other photocells of said array associated with other peripheral features of said shadow, the improvement which consists in using two distinct and separate ones of said systems, said two systems being oriented to scan the article at two different angles.

2. Apparatus as set forth in claim 1, wherein said two systems are oriented to form two light beams at an angle of approximately 70° one to the other.

3. Apparatus as set forth in claim 2, wherein a first of said two systems is set up for gauging one diametrical chord dimension of said article, and the second of said two systems is set up for gauging another diametrical chord dimension of said article, thus effectively gauging for out-of-roundness, ovality, of said article.

4. Apparatus as set forth in claim 3, wherein an additional scanning system is provided and oriented to gauge the height of said article, said additional scanning system being incorporated in either one of said diametrical chord dimension gauging systems.

5. Apparatus as set forth in claim 4 wherein the output of the logic circuits associated with each of said systems is fed to a relay having contacts connected to indicator means.

No references cited.

RALPH G. NILSON, *Primary Examiner.*

T. N. GRIGSBY, *Assistant Examiner.*

U.S. Cl. X.R.

88—14; 250—214, 219